(12) United States Patent
Sauter

(10) Patent No.: US 6,952,638 B2
(45) Date of Patent: Oct. 4, 2005

(54) CURVE-DEPENDENT ENGINE DRAG-TORQUE CONTROL

(75) Inventor: Thomas Sauter, Remseck (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/401,066

(22) Filed: Mar. 27, 2003

(65) Prior Publication Data

US 2003/0221889 A1 Dec. 4, 2003

(30) Foreign Application Priority Data

Mar. 27, 2002 (DE) .......................................... 102 13 662
Aug. 21, 2002 (DE) .......................................... 102 38 224

(51) Int. Cl.$^7$ .................................................. G06F 7/00
(52) U.S. Cl. ............................. 701/84; 701/74; 701/90; 180/197
(58) Field of Search ............................. 701/84, 36, 74, 701/80, 90; 180/197

(56) References Cited

U.S. PATENT DOCUMENTS

| | | | | |
|---|---|---|---|---|
| 5,019,989 A | * | 5/1991 | Ueda et al. | 701/104 |
| 5,073,865 A | * | 12/1991 | Togai et al. | 701/103 |
| 5,092,435 A | * | 3/1992 | Sone et al. | 477/169 |
| 5,419,624 A | * | 5/1995 | Adler et al. | 303/112 |
| 5,471,388 A | * | 11/1995 | Zomotor et al. | 701/36 |
| 5,584,541 A | * | 12/1996 | Sone et al. | 303/146 |
| 5,584,719 A | * | 12/1996 | Tsuji et al. | 439/354 |
| 5,657,229 A | * | 8/1997 | Naito et al. | 701/71 |
| 5,806,010 A | * | 9/1998 | Sawada | 701/70 |
| 5,947,221 A | * | 9/1999 | Taniguchi et al. | 180/197 |
| 6,223,114 B1 | * | 4/2001 | Boros et al. | 701/70 |
| 6,298,297 B1 | * | 10/2001 | Colby et al. | 701/85 |
| 6,494,282 B1 | * | 12/2002 | Hessmert et al. | 180/197 |
| 6,584,398 B1 | * | 6/2003 | Erban | 701/82 |
| 2003/0216850 A1 | * | 11/2003 | Trefzer et al. | 701/82 |

OTHER PUBLICATIONS

JP 2003293818 English abstract Oct. 15, 2003 Sauter et al.*

* cited by examiner

Primary Examiner—Olga Hernandez
(74) Attorney, Agent, or Firm—Kenyon & Kenyon

(57) ABSTRACT

An engine drag-torque control, particularly for motor vehicles, in which the engine torque is increased by an EDC augmenting torque when the driven wheels drop below a slip threshold due to the braking action of the engine and exhibit a brake slip which is too high. To improve the vehicle control during cornering on a roadway having a low coefficient of friction, it is provided to increase the slip threshold for the driven wheels to thereby set the drag-torque control to be more sensitive.

18 Claims, 3 Drawing Sheets

CURVE-DEPENDENT ENGINE DRAG-TORQUE CONTROL

FIELD OF THE INVENTION

The present invention relates to an engine drag-torque control (EDC) for motor vehicles, as well as a corresponding method.

BACKGROUND INFORMATION

When shifting down or when releasing the accelerator abruptly on a slippery roadway, the driven wheels of a vehicle may slip due to the braking action of the engine. In order to continue to ensure sufficient directional stability of the vehicle, the EDC raises the engine torque by giving gas lightly as soon as one driven wheel has dropped below a predefined slip threshold. The braking of the wheels is thereby reduced to an extent necessary for the directional stability.

Conventional drag-torque controls function reliably when driving on straight roads, but allow too much wheel slip in curves. Especially when cornering on a slippery roadway, this wheel slip results in a further reduction of the cornering stability. Particularly for vehicles with rear-wheel drive, the lack of cornering stability can lead to critical driving situations such as, for example, the breakaway of the vehicle tail.

FIG. 1 shows the speed of one driven wheel 1 in comparison to that of the vehicle (curve 3). If a driven wheel goes into slippage because of shifting down or upon releasing the accelerator abruptly, then its speed 1 diminishes in relation to vehicle speed 3. This can be seen in the profile of characteristic curve 1 by several speed drops 4.

The EDC control begins when wheel speed 1 has dropped below a predefined slip threshold 2. In the following, the EDC ascertains an engine torque which accelerates the powered axle of the vehicle essentially to a reference speed (usually the vehicle speed) and increases the engine torque by this value. Therefore, the engine drag-torque control causes a reduction of the drag slip, and the driven wheels are able to grip again.

During straight-ahead driving, the augmenting torque determined by known engine drag-torque controls usually suffices to ensure the vehicle stability. However, when cornering on a slippery roadway (low coefficient of friction), the magnitude and duration of the slippage is clearly too great to achieve the necessary cornering stability of the vehicle. Above all when the driver releases the accelerator while cornering on a roadway with low coefficient of friction and the driven wheels go only slowly into a state of slippage, conventional EDCs determine an augmenting torque which is much too low. The danger thereby exists that the vehicle will go out of its lane.

Therefore, an object of an present invention is to optimize an engine drag-torque control for cornering on a slippery roadway, and to improve the vehicle stability under these conditions.

SUMMARY OF THE INVENTION

A main idea of the present invention is that after recognizing a driving situation in which the vehicle is cornering on a roadway with low coefficient of friction, to increase the slip threshold for at least one of the driven wheels (preferably the outer wheel), and thus to adjust the EDC control to be more sensitive than, for example, for straight-ahead driving. The EDC control is thereby already initiated in response to very low brake slip, so that the extent and duration of the wheel slip may be markedly reduced.

Suitable means, i.e. an appropriate sensor suite, are provided for recognizing cornering on a roadway with a low coefficient of friction. The cornering is recognized, for example, based on the difference in speed of the non-driven wheels.

The coefficient of friction may be detected, for example, by a lateral-acceleration sensor. The lateral acceleration occurring is an indication for the coefficient of friction of the roadway. A low coefficient of friction, (e.g. less than 0.35) may be ruled out, for example, when the lateral acceleration is greater than, for instance, 5.5 m/s$^2$. However, the predominating coefficient of friction may also be qualitatively recognized, for example, based on the slippage occurring at the outside wheel pair.

According to one preferred specific embodiment, the slip thresholds of both driven wheels are raised uniformly. The slip threshold(s) may be raised as a function of the vehicle speed, the ascertained coefficient of friction and/or the curve radius.

When cornering on a slippery roadway, the engine torque during the EDC control is preferably raised at least by a minimum augmenting torque. This is carried out primarily because in response to releasing the accelerator, the driven wheels go only slightly into a slip state, and in addition, the drivetrain exhibits only low dynamics, so that without stipulating a minimum augmenting torque, an augmenting torque would be calculated which is much too low.

The EDC of the present invention differentiates preferably between two causes of the wheel slip: First of all, because of releasing the accelerator, and secondly because of a downshift operation. Upon releasing the accelerator, a gradual slip occurs which is relatively small in amplitude. However, in response to "hard" downshifting, great slippage develops which builds up abruptly.

To minimize the wheel slip in response to a downshift operation, and particularly also to compensate for hard clutch engagement, preferably an increased augmenting torque is calculated which is comparatively higher than for the case of releasing the accelerator.

Augmenting torque Mae is generally calculated as:

$$Mae = Mlamb + Mwbr,$$

where Mlamb is a slip-proportional component (=slip*constant) and Mwbr is the so-called rotary acceleration moment of resistance.

In the case of a downshift operation, preferably an amplified rotary acceleration moment of resistance is calculated, which is greater than the moment actually needed for the moment compensation. The amplified rotary acceleration moment of resistance Mwbr is preferably calculated according to the following equation:

$$Mwbr = \text{drivetrain acceleration} * \text{mass moment of inertia} * \text{amplification factor.}$$

If inserted into the formula for calculating augmenting torque Mae indicated above, an increased augmenting torque is therefore yielded.

According to one preferred specific embodiment of the invention, a maximum value is preset for the rotary acceleration moment of resistance, so that the amplified acceleration moment of resistance does not inadvertently lead to the vehicle being pushed from the rear.

The amplified acceleration moment of resistance or the increased augmenting torque may also be calculated as a function of which gear was downshifted to. A greater augmenting torque is preferably calculated when downshifting to a low gear than when downshifting to a higher gear.

After a driven wheel has again exceeded the slip threshold, the EDC control is preferably continued for a predefined follow-up time, and during this time a follow-up augmenting torque is set. This follow-up augmenting torque is preferably calculated in such a way that the driven wheels do not go, or go only minimally into a slip state, and the engine does not go over to overrun fuel cutoff.

The follow-up time is preferably longer than for straight-ahead driving, and is preferably between one and three seconds.

After recognizing a cornering on a roadway with low coefficient of friction, the slip thresholds for the driven wheels are preferably set to values between 1.5 km/h and 2 km/h for a vehicle with front-wheel drive, and for a vehicle with rear-wheel drive, to values between 1 km/h and 1.5 km/h (deviation with respect to the vehicle speed).

DETAILED DESCRIPTION

Figure 1:
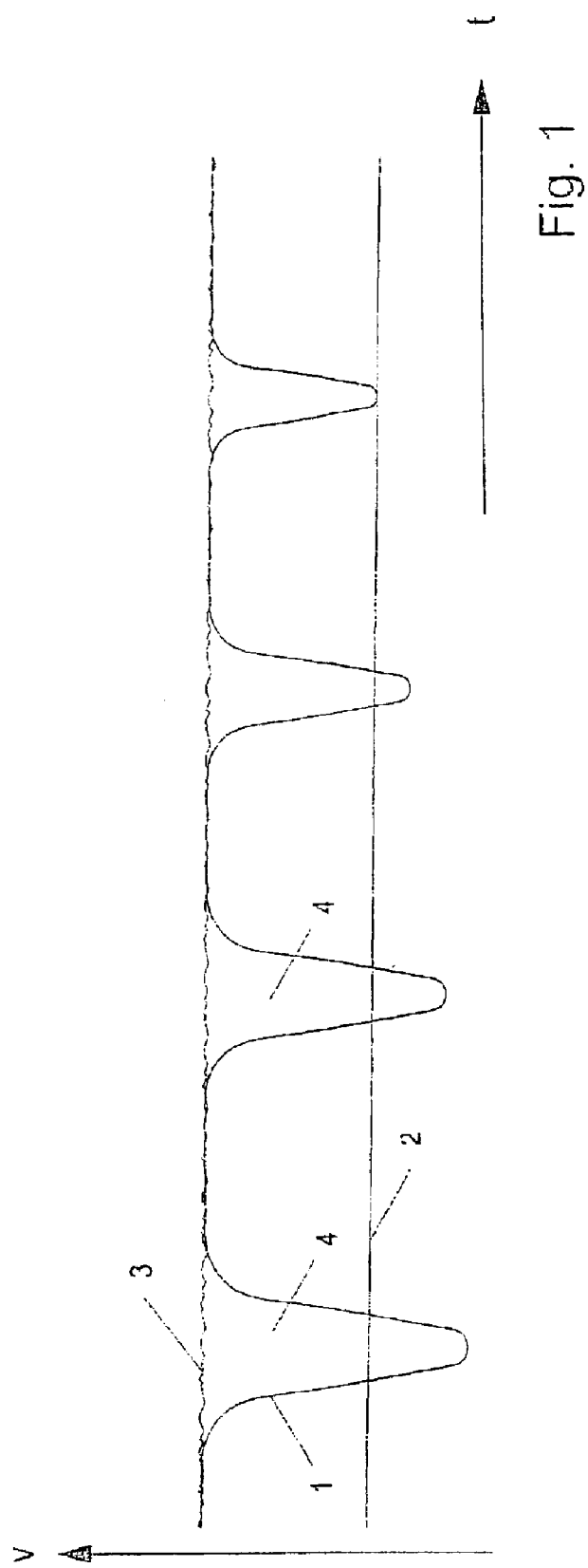
FIG. 1 shows the speed profile of a driven wheel during an EDC control according to the related art.

Reference is made to the introductory part of the specification regarding the clarification of FIG. 1.

Figure 2:
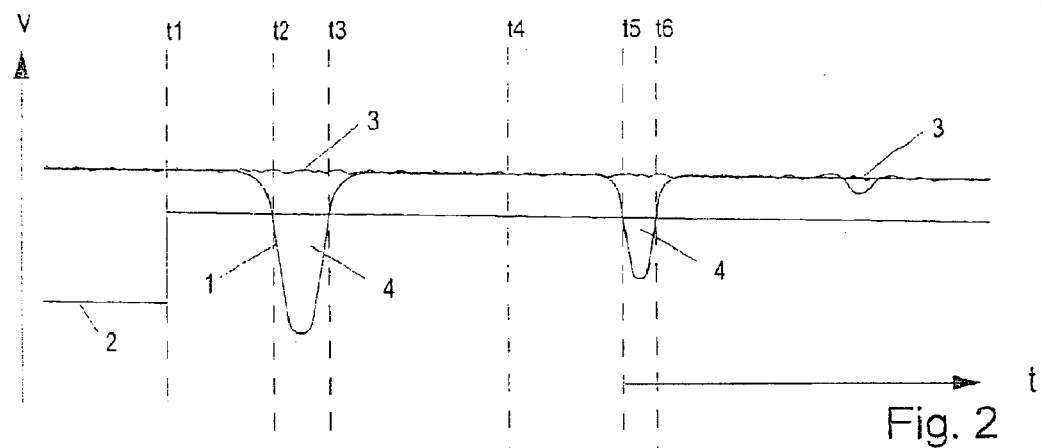
FIG. 2 shows the speed profile of a driven wheel in the case of an EDC control according to a specific embodiment of the present invention.

FIG. 2 shows speed profile 1 of a driven wheel in comparison to vehicle speed 3. At point of time t1, the device for detecting curves and coefficients of friction detects that the vehicle is cornering on a roadway having a low coefficient of friction, whereupon slip threshold 2 is increased abruptly. The EDC control is thus adjusted to be considerably more sensitive.

Shortly prior to point of time t2, one or both driven wheels go into drag slip. In the following, wheel speed 1 decreases sharply compared to vehicle speed 3.

At point of time t2, wheel speed 1 drops below increased slip threshold 2, whereby the EDC control commences. The EDC calculates an augmenting torque Mae composed first of all of a slip-proportional component Mlamb (=slip*constant), and secondly, of a component Mwbr corresponding to the drivetrain acceleration. The latter is designated as rotary acceleration moment of resistance Mwbr and corresponds to the product of the average drivetrain acceleration and the mass moment of inertia of the drivetrain (in the corresponding transmission step).

The EDC augmenting torque Mae is therefore calculated as:

$$Mae = Mlamb + Mwbr$$

Figure 3:
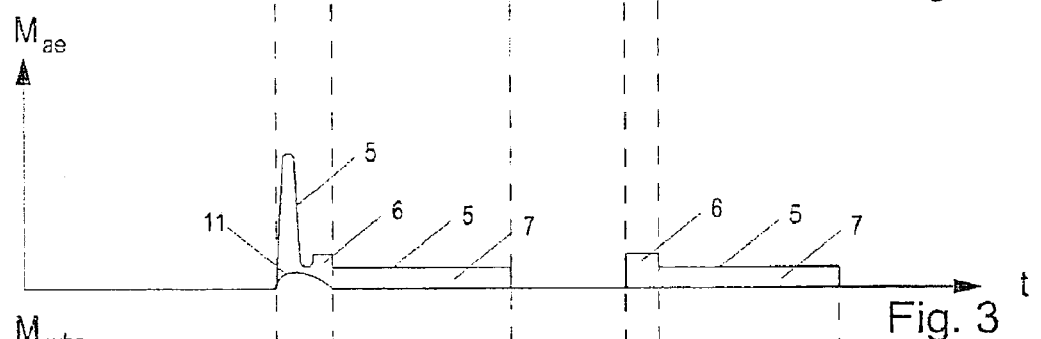
FIG. 3 shows the profile of the EDC augmenting torque.
Figure 4:
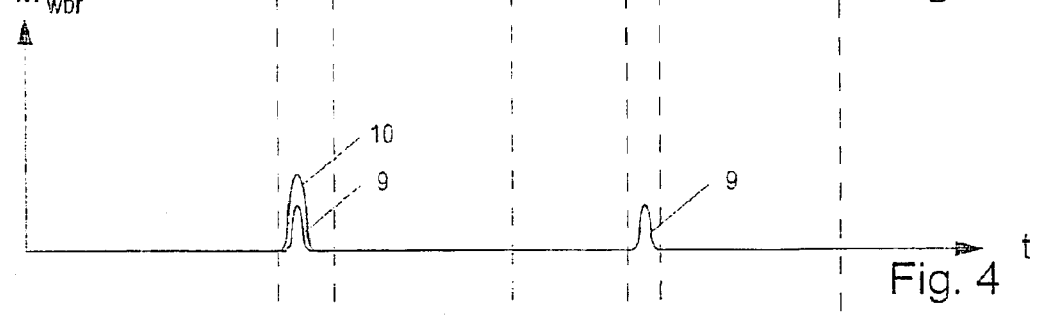
FIG. 4 shows the rotary acceleration moment of resistance under various conditions.

Augmenting torque 5 transmitted is shown in FIG. 3. Slip-proportional component 11 of augmenting torque 5 is likewise shown in FIG. 3; rotary acceleration moment of resistance 9 and 10, respectively, is shown in FIG. 4.

In the case of drag slip due to releasing the accelerator, an acceleration moment of resistance 9 is calculated which corresponds essentially to the actual physical value (Mwbr= drivetrain acceleration*mass moment of inertia) which is necessary to accelerate the drivetrain to the reference speed (usually the vehicle speed).

In the case of drag slip due to downshifting, this moment is also multiplied by an amplification factor in order to compensate as quickly as possible for the high drag slip occurring upon downshifting, particularly also due to hard engagement of the clutch.

So that amplified acceleration moment of resistance 10 does not inadvertently lead to pushing the vehicle from the rear, maximum values are specified for amplified acceleration moment of resistance 10.

During the actual EDC control phase (between points of time t2, t3 and t5, t6), in each case a minimum augmenting torque 6 is transmitted by the drag-torque control. Given a gradual slip characteristic, as occurs particularly in response to releasing the accelerator, a minimum effect may thus be achieved and sufficient cornering stability ensured.

The EDC control is furthermore extended by a follow-up time (t3 to t4). During the follow-up time, a follow-up augmenting torque 7 is transmitted which prevents the engine from braking too strongly and the driven wheels from going immediately again into slippage. Follow-up augmenting torque 7 may be less than or equal to minimum torque 6.

Figure 5:
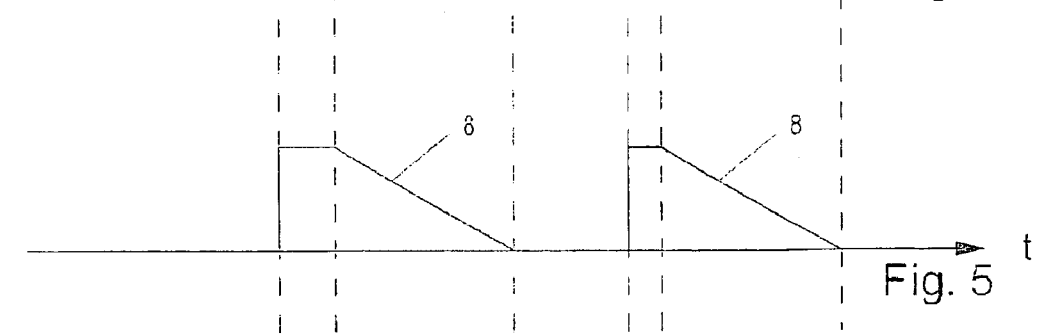
FIG. 5 shows the profile of a counter signal for setting a follow-up time.

For example, the follow-up-time is set by a counter whose signal 8 is represented in FIG. 5. The follow-up time is longer than for straight-ahead driving, and amounts preferably to more than 1 second.

Figure 6:
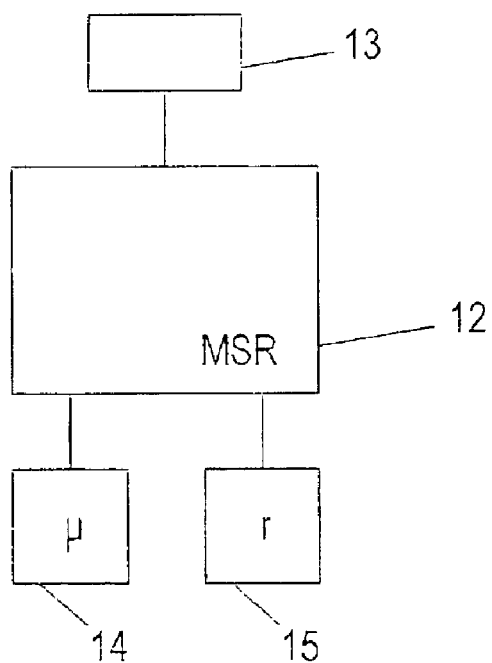
FIG. 6 shows an exemplary embodiment of an EDC system set up according to the present invention.

FIG. 6 shows an EDC system having a central EDC control unit 12 which is connected to devices 14, 15 for detecting curves and coefficients of friction. If a driving situation is recognized in which the vehicle is cornering on a roadway having a low coefficient of friction, then slip threshold 2 is increased for at least one of the driven wheels.

If speed 1 of a driven wheel drops below this newly set slip threshold 2, then EDC control unit 12 calculates an augmenting torque Mae which is supplied to an engine management 13 that, in the following, sets the engine torque accordingly.

Figure 7:
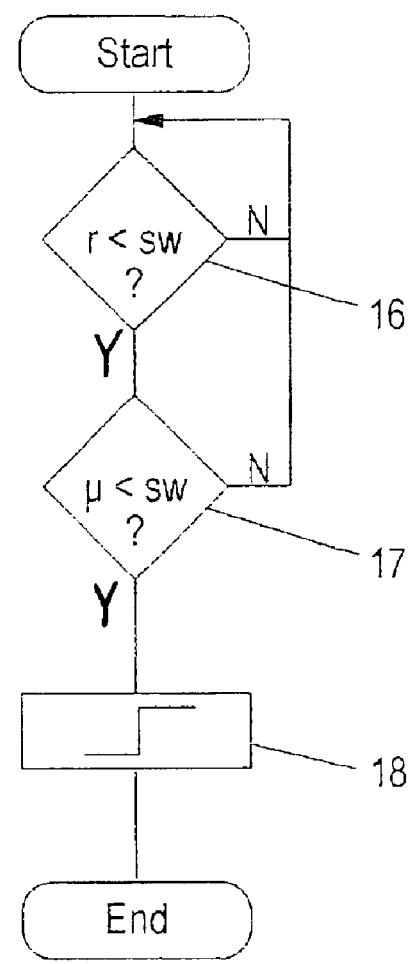
FIG. 7 shows a flowchart for representing the method steps when increasing the slip thresholds.

FIG. 7 shows the method steps during an increase of slip thresholds 2 in response to cornering on a roadway having a low coefficient of friction. In so doing, it is initially established in step 16 whether the vehicle is cornering. Finally, in step 17, coefficient of friction $\mu$ is ascertained at least qualitatively, and it is determined whether the roadway has a low coefficient of friction.

In step 18, slip threshold 2 of the driven wheels is finally increased, in order to improve the stability of the vehicle during cornering.

REFERENCE NUMERAL LIST 1 wheel speed
2 slip threshold
3 vehicle speed 4 slip phase
5 EDC augmenting torque
6 minimum augmenting torque
7 follow-up augmenting torque
8 counter signal
9 acceleration moment of resistance
10 amplified acceleration moment of resistance
11 slip-proportional component
12 EDC control unit
13 engine management
14 means for detecting coefficient of friction
15 means for detecting curves
16–18 method steps

What is claimed is:

1. An engine drag-torque controller for a motor vehicle comprising:

a detecting arrangement for detecting curves and coefficients of friction; and an arrangement for increasing the torque of an engine when at least one driven wheel falls below a slip threshold due to a braking action of the engine, the arrangement increasing the slip threshold for at least one driven wheel in response to cornering on a roadway having a low coefficient of friction;

wherein, in response to wheel slip because of a downshift operation, the engine torque is increased by a boosted augmenting torque which is greater than an augmenting torque in response to releasing an accelerator.

2. The engine drag-torque controller according to claim 1, wherein the augmenting torque added in response to wheel slip because of a downshift operation is calculated as a function of which gear was downshifted to.

3. An engine drag-torque controller for a motor vehicle comprising:

a detecting arrangement for detecting curves and coefficients of friction; and an arrangement for increasing the torque of an engine when at least one driven wheel falls below a slip threshold due to a braking action of the engine, the arrangement increasing the slip threshold for at least one driven wheel in response to cornering on a roadway having a low coefficient of friction;

wherein, in response to wheel slip because of a downshift operation, an amplified rotary acceleration moment of resistance is calculated.

4. The engine drag-torque controller according to claim 3, wherein the amplified rotary acceleration moment of resistance is restricted to a maximum value.

5. An engine drag-torque controller for a motor vehicle comprising:

a detecting arrangement for detecting curves and coefficients of friction; and an arrangement for increasing the torque of an engine when at least one driven wheel falls below a slip threshold due to a braking action of the engine, the arrangement increasing the slip threshold for at least one driven wheel in response to cornering on a roadway having a low coefficient of friction;

wherein the engine torque is increased by at least a minimum augmenting torque.

6. An engine drag-torque controller for a motor vehicle comprising:

a detecting arrangement for detecting curves and coefficients of friction; and an arrangement for increasing the torque of an engine when at least one driven wheel falls below a slip threshold due to a braking action of the engine, the arrangement increasing the slip threshold for at least one driven wheel in response to cornering on a roadway having a low coefficient of friction;

wherein, after the driven wheel has exceeded the slip threshold again, the arrangement continues an engine-drag torque control for a predefined follow-up time, and during the follow-up time, a follow-up augmenting torque is generated.

7. A method for engine drag-torque control for a motor vehicle, the engine torque being increased when at least one driven wheel drops below a slip threshold due to a braking action of the engine and exhibits a brake slip which is too high, the method comprising:

determining whether the vehicle is cornering;

ascertaining a coefficient of friction of a roadway;

raising the slip threshold for at least one driven wheel if cornering was detected on a roadway having a low coefficient of friction; and calculating a boosted augmenting torque in response to wheel slip because of a downshift operation.

8. The method according to claim 7, wherein the engine torque is increased by at least a minimum augmenting torque.

9. The method according to claim 7, further comprising calculating a boosted augmenting torque in response to wheel slip because of a downshift operation, wherein the engine torque is increased by at least a minimum augmenting torque.

10. A method for engine drag-torque control for a motor vehicle, the engine torque being increased when at least one driven wheel drops below a slip threshold due to a braking action of the engine and exhibits a brake slip which is too high, the method comprising:

determining whether the vehicle is cornering;

ascertaining a coefficient of friction of a roadway; raising the slip threshold for at least one driven wheel if cornering was detected on a roadway having a low coefficient of friction;

continuing an engine drag-torque control for a predefined follow-up time after the slip threshold has been exceeded; and predefining a follow-up augmenting torque during the follow-up time.

11. A method for engine drag-torque control for a motor vehicle, the engine torque being increased when at least one driven wheel drops below a slip threshold due to a braking action of the engine and exhibits a brake slip which is too high, the method comprising:

determining whether the vehicle is cornering;

ascertaining a coefficient of friction of a roadway; raising the slip threshold for at least one driven wheel if cornering was detected on a roadway having a low coefficient of friction;

continuing an engine drag-torque control for a predefined follow-up time after the slip threshold has been exceeded; and predefining a follow-up augmenting torque during the follow-up time wherein the engine torque is increased by at least a minimum augmenting torque.

12. An engine drag-torque controller for a motor vehicle comprising:

a detecting arrangement for detecting curves and coefficients of friction; and an arrangement for increasing the torque of an engine when at least one driven wheel falls below a slip threshold due to a braking action of the engine, the arrangement increasing the slip threshold for at least one driven wheel in response to cornering on a roadway having a low coefficient of friction;

wherein:
in response to wheel slip because of a downshift operation, the engine torque is increased by a boosted augmenting torque which is greater than an augmenting torque in response to releasing an accelerator, and in response to wheel slip because of a downshift operation, amplified rotary acceleration moment of resistance is calculated.

13. The engine drag-torque controller according to claim 12, wherein the amplified rotary acceleration moment of resistance is restricted to a maximum value.

14. The engine drag-torque controller according to claim 12, wherein the engine torque is increased by at least a minimum augmenting torque.

15. The engine drag-torque controller according to claim 12, wherein, after the driven wheel has exceeded the slip threshold again, the arrangement continues an engine-drag torque control for a predefined follow-up time, and during the follow-up time, a follow-up augmenting torque is generated.

16. The engine drag-torque controller according to claim 15, wherein the augmenting torque added in response to wheel slip because of a downshift operation is calculated as a function of which gear was downshifted to.

17. The engine drag-torque controller according to claim 15, wherein the engine torque is increased by at least a minimum augmenting torque.

18. The engine drag-torque controller according to claim 13, wherein the augmenting torque added in response to wheel slip because of a downshift operation is calculated as a function of which gear was downshifted to.

* * * * *